No. 687,336. Patented Nov. 26, 1901.
I. RIFFLE.
DRAFT ATTACHMENT FOR VEHICLES OR MACHINES.
(Application filed July 25, 1901.)
(No Model.)
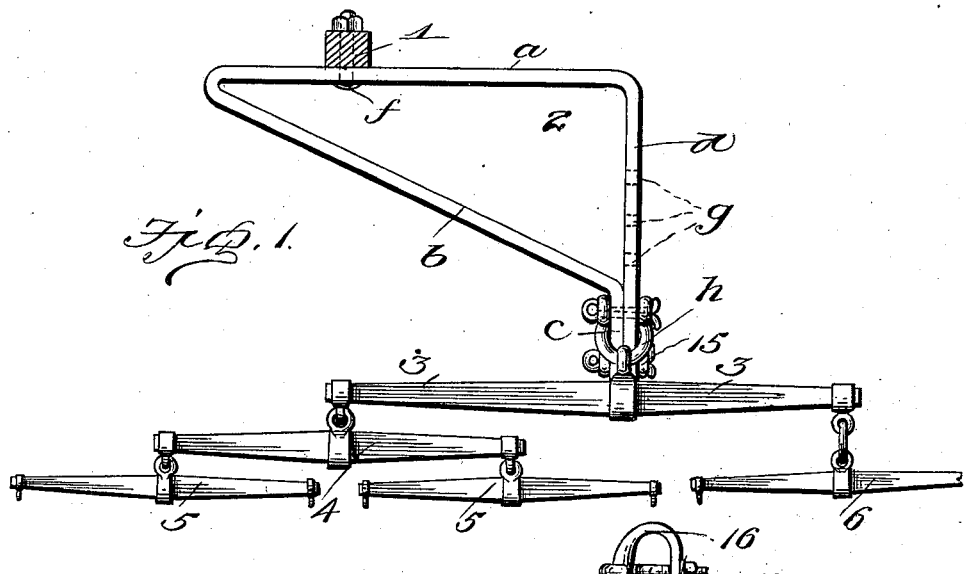
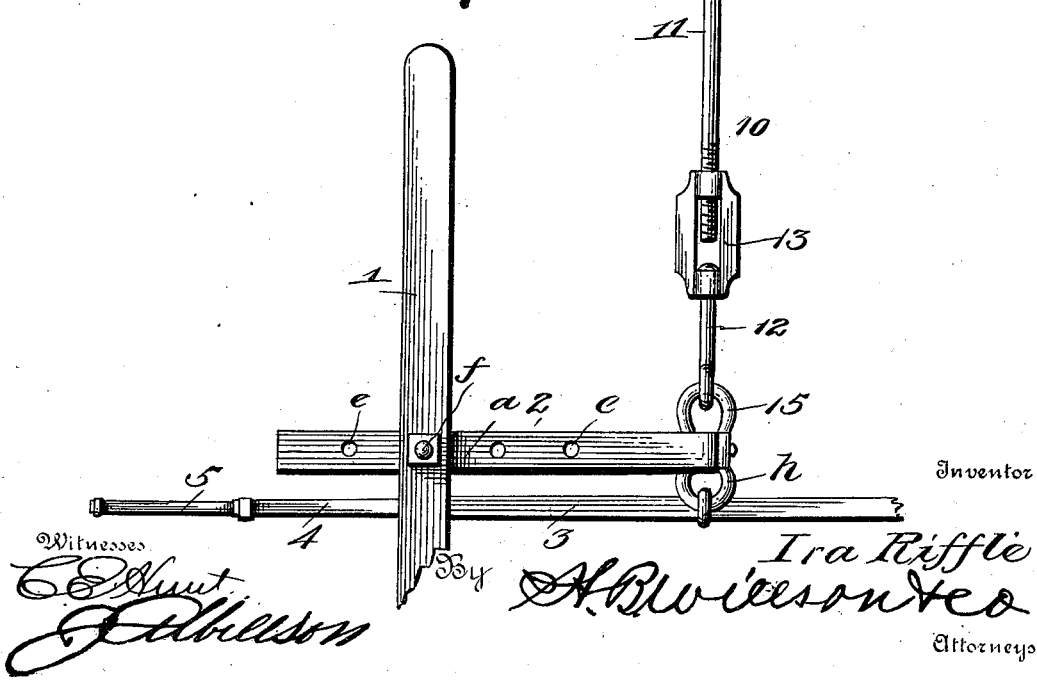

United States Patent Office.

IRA RIFFLE, OF MALVERN, IOWA.

DRAFT ATTACHMENT FOR VEHICLES OR MACHINES.

SPECIFICATION forming part of Letters Patent No. 687,336, dated November 26, 1901.

Application filed July 25, 1901. Serial No. 69,656. (No model.)

*To all whom it may concern:*

Be it known that I, IRA RIFFLE, a citizen of the United States, residing at Malvern, in the county of Mills and State of Iowa, have invented certain new and useful Improvements in Draft Attachments for Vehicles or Agricultural Machines; and I do declare the following to be a full, clear, and exact description of the invention, such as will enable others skilled in the art to which it appertains to make and use the same.

The invention relates to draft attachments for vehicles and agricultural machines whereby the ordinary three-horse equalizer may be connected thereto and worked without causing side draft on the tongue of the vehicle or agricultural machine and the weight on the tongue and on the neck of the horses reduced to a minimum.

With this and other objects in view the invention consists of certain novel features of construction, combination, and arrangement of parts which will be hereinafter more fully described, and particularly pointed out in the appended claims.

In the accompanying drawings, Figure 1 is a vertical sectional view through the tongue and draft-pole of a vehicle or agricultural machine, illustrating the application of my invention thereto and showing the three-horse equalizer suspended therefrom; and Fig. 2 is a top plan view of the same parts.

Referring to the drawings, 1 denotes the tongue or pole of a vehicle or the beam of an agricultural machine, which may be of any well-known or approved construction.

2 denotes a transversely-disposed frame which consists of a horizontal portion $a$, terminating at one end in a diagonally-extending portion $b$, terminating in a vertical portion $c$. The horizontal portion terminates at its opposite end in a vertical portion $d$, which lies against the vertical portion $c$. The horizontal portion $a$ is provided with a horizontal row of apertures $e$, by means of which the frame may be laterally adjustably connected to the tongue or pole by the bolt $f$, and the vertical portion $d$ is provided with a vertical row of apertures $g$, by means of which the shackle $h$ may be vertically adjusted to this portion of the frame. This shackle is loosely connected to a kingtree 3, having at one end a doubletree 4, to the ends of which are loosely connected singletrees 5, while at the other end of the kingtree is connected a singletree 6.

10 denotes a draft-rod, consisting of two parts 11 and 12, the inner ends of which are screw-threaded and are adjustably connected together by a turnbuckle 13. The forward end of the draft-rod is connected to the vertical portions $c$ and $d$ by a shackle 15, while the rear end is formed with a hoop 16, which is adapted to be engaged with the axle of a vehicle or the fixed part of an agricultural machine and held in place by a hook 16', provided with a clamping-nut 17.

From the foregoing description, taken in connection with the accompanying drawings, the construction, mode of operation, and advantages of my invention will be readily understood without requiring a more extended explanation.

Various changes in the form, proportion, and details of construction may be made within the scope of the invention without departing from the spirit or sacrificing any of the advantages thereof.

Having thus described my invention, what I claim, and desire to secure by Letters Patent, is—

1. A draft attachment for the purpose described, consisting of a transversely-disposed frame, means for laterally adjustably connecting it to the tongue of a vehicle or the beam of an agricultural machine, and an extensible draft-rod adapted to be connected at one end to the fixed part of a vehicle or agricultural machine and vertically adjustably connected at its opposite end to said frame, substantially as set forth.

2. In a draft attachment for the purpose described, the combination with a transverse frame consisting of a horizontal portion terminating at one end in a diagonally-extending portion which in turn terminates in a vertical portion, said horizontal portion terminating at its opposite end in a vertical portion which lies parallel with and is secured to the first-named vertical portion, the horizontal portion and the second-named vertical portion each being provided with a row of apertures, bolts for adjustably connecting the tongue or beam of a vehicle or agricultural machine to the horizontal portion, a shackle vertically adjustably secured in the apertures of the vertical portion and provided with a three-horse evener, an extensible draft-rod having its rear end connected to a fixed part of the vehicle or agricultural machine, and a shackle for connecting the forward end of the draft-rod to the vertical portions of the transverse frame, substantially as set forth.

In testimony whereof I have hereunto set my hand in presence of two subscribing witnesses.

IRA RIFFLE.

Witnesses:
   D. E. WHITFIELD,
   WILL KESTERSON.